Patented Feb. 6, 1945

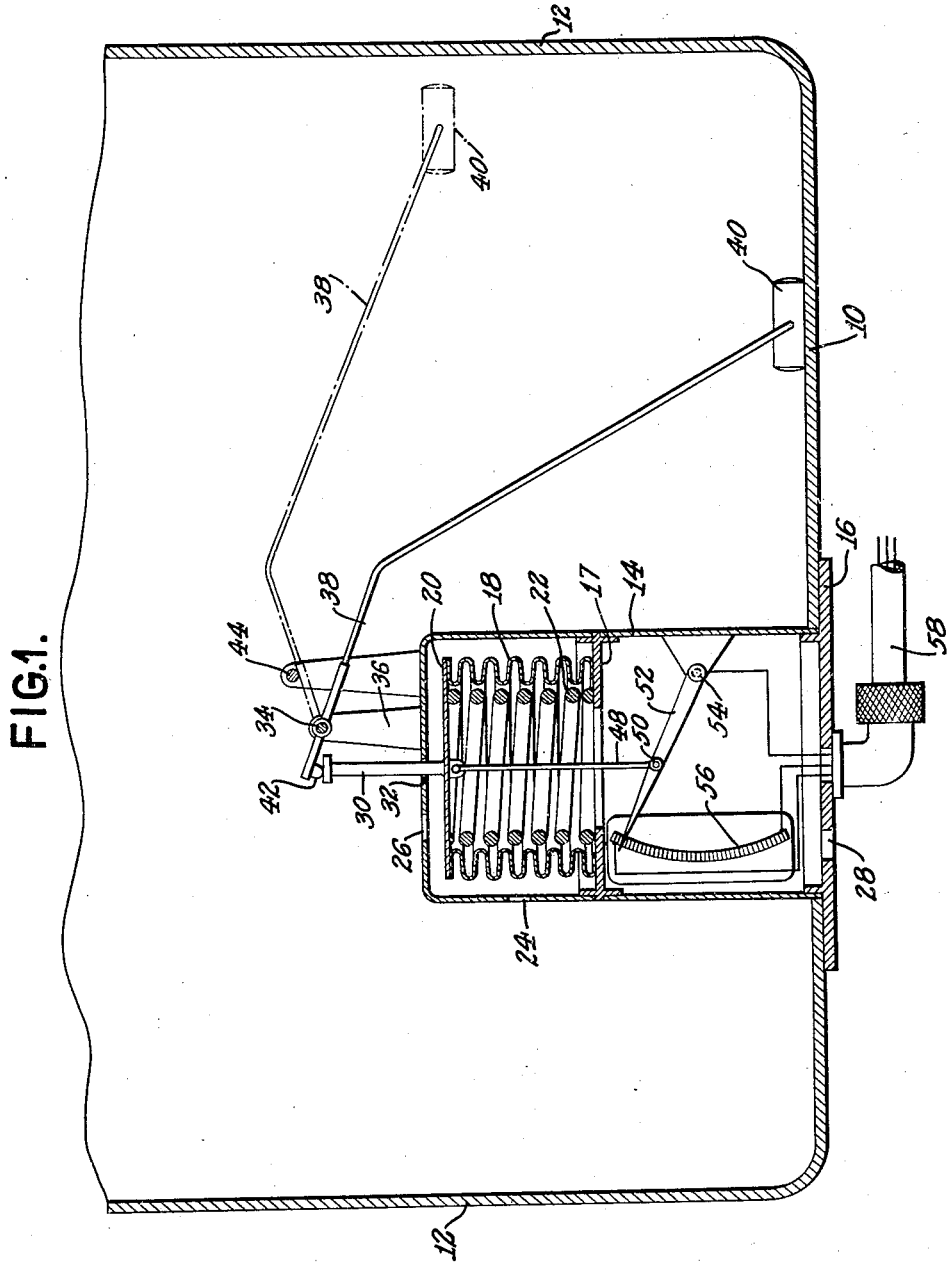

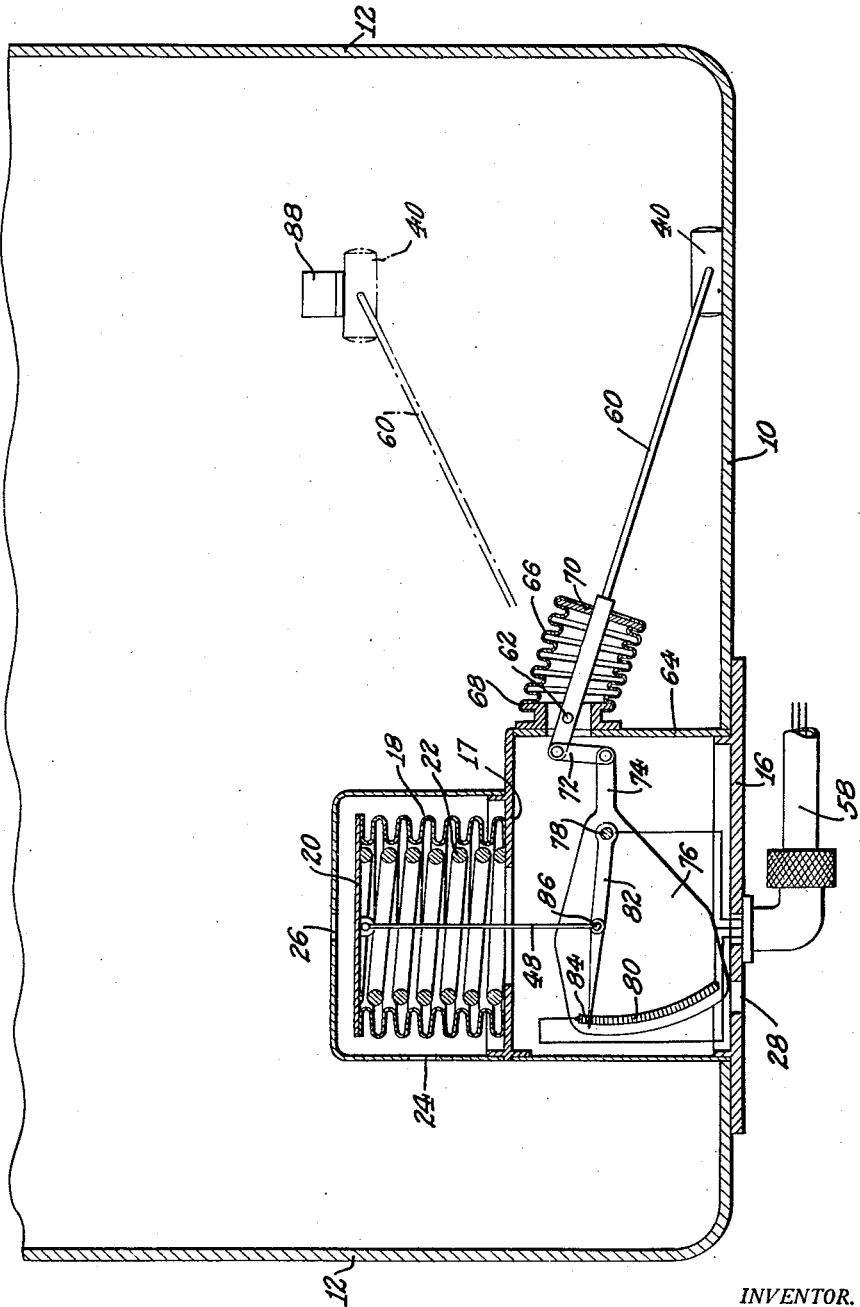

2,369,027

UNITED STATES PATENT OFFICE 2,369,027

CONTENTS GAUGE FOR DEEP TANKS

Clarence A. de Giers, Forest Hills, N. Y., assignor to The Liquidometer Corporation, Long Island City, N. Y., a corporation of Delaware Application March 9, 1943, Serial No. 478,520

3 Claims. (Cl. 73—313)

This invention pertains to instruments for indicating the amount of liquid in a tank.

An object of the invention is to disclose improvements which render such instruments more suitable for use in tanks of such shape that there is not sufficient clearance for the full movement of a float-and-arm type gauge, as, for instance, a tall tank of small diameter.

An advantage of the float-and-lever is the fact that there is always plenty of power available for operation of the indicator. A disadvantage of the float-and-lever is the fact that in a deep tank it is usually necessary to use a series of floats, one above the other, as disclosed in my Patents Nos. 2,104,898 and 2,177,058, in which the floats are arranged so that as the tank fills and each float reaches its upper limit of travel the float next above it begins to move upwardly from its position of rest. As the tank is emptied the reverse movement of the floats takes place.

On the other hand, a single instrument operable by hydrostatic pressure of the liquid in the tank may readily be arranged to give indications regardless of the shape and depth of the tank. However, a hydrostatic device has a very serious defect in that when the tank is nearly empty the pressure is not sufficient to positively operate an indicator, and the indications are therefore undependable just at the stage when accurate information is most necessary, especially if the instrument is used in aircraft. Another shortcoming of the strictly hydrostatic instrument is liability of error due to differences of densities of liquids being gauged.

The invention comprises the combination of the hydrostatic and float-and-arm devices in a single instrument. Hydrostatic pressure alone is relied upon for actuating the indicator above a predetermined level, with the float-and-arm device effective below that level.

A bellows is used for actuating the indicator, and an understanding of the invention may be obtained by considering first a device arranged with the head of the bellows level with the tank bottom when the tank is empty, and with no float-and-arm device in use. Depression of the bellows head will then vary directly with all variations of level of the tank contents. However, just when the most exact knowledge of the level is necessary (i. e. when the tank is nearly empty) the indicator is undependable, as stated above.

To overcome the difficulty just mentioned, I install a float-and-arm device arranged to cooperate with the hydrostatic device whenever the tank is in near-empty condition, thus providing the power necessary to insure positive operation of the indicator even to the lowest possible liquid level.

The resiliency of the bellows is usually aided by a spring contained within the bellows. The action of the float-and-arm may be adjusted to compress the bellows the same amount as if the static head alone was effective, or it may be adjusted to give larger movements of the indicator for the same change of head, thereby aiding still further in giving accurate, and more easily read, indications than normal, when the tank is nearly empty.

In the above discussion it was assumed that the head of the bellows was level with the tank bottom, which would mean that the housing enclosing the bellows would be below the tank bottom, but since such a condition would not be permitted in aircraft, it is necessary to place the bellows and indicator transmitting mechanism inside the tank. The head of the bellows is then well above the bottom of the tank and therefore above the level of the liquid when the tank is nearly empty, which means that the float alone is effective when the liquid level is below the bellows head. All parts are so proportioned and arranged as to provide a smooth change of indication from hydraulic control, to or from float control, at a point well above near-empty condition.

An object of the invention is to avoid the above shortcomings of the hydrostatic gauge by providing a float-and-lever device which automatically cooperates with the hydrostatic device whenever liquid level in the tank is low, thereby giving dependable information throughout the entire range of liquid level.

Further and other objects and advantages will be apparent from the specification and claims, and from the accompanying drawings which illustrate what is now considered to be a preferred embodiment of the invention.

In the drawings:

Fig. 1 illustrates one embodiment of the invention.

Fig. 2 shows a modified form of the invention.

The drawings shows the lower part of a liquid-containing tank, the bottom of which is designated 10, and the sides 12. Mounted on bottom 10 (Fig. 1) is a casing 14 having an attaching flange 16. Supported in the upper part of casing 14, by an annular partition or shelf 17, is a bellows 18, closed at its upper end by a head 20, and containing a coil spring 22 resting on shelf 17. The lower end of the bellows is sealed to shelf 17. The upper part of casing 14 is provided with openings such as 24, 26, through which the tank contents have access to the exterior of the bellows and its head 20. The interior of the bellows and the lower part of casing 14 are sealed from the tank contents and may be open to atmosphere, as through an opening 28.

Fast on head 20 is an upwardly extending stem 30 which passes through a hole in the top 32 of casing 14. Fulcrumed at 34 on a support 36 is an arm 38 carrying a float 40. The short arm of lever 38 has a contact button 42 adapted to bear on the top of stem 30. A fixed stop 44 limits the upward travel of the float.

Extending downwardly from head 20 is a link 48, the lower end of which is connected at 50 to a swinging arm 52 fulcrumed at 54. The free end of arm 52 has a rider adapted to travel along a resistance strip 56. Suitable electric wiring extends through conduit 58 to operate a remote appropriately graduated indicator, in well known manner.

With the above structure in mind it will be appreciated that as the tank is filled float 40 will rise, button 42 will depress stem 30, head 20, link 48 and arm 52 until float arm 38 encounters stop 44. Any further depression of head 20 and arm 52 will be due only to the hydraulic pressure of the liquid.

The embodiment of the invention illustrated in Fig. 2 differs from Fig. 1 in that there is no overlapping of float action and static action. In this modification the float provides the power in the lower portion of the tank, and hydrostatic pressure provides the power above the point where the float stops.

In Fig. 2, float arm 60 is pivoted at 62 on housing 64. One end of a bellows 66 is sealed to the housing at 68 and its other end is sealed to arm 60 at 70. This construction is disclosed in my Patent No. 2,177,058.

Link 72 connects the inner end of arm 60 to arm 74 integral with a plate 76 fulcrumed at 78. Arcuate resistance strip 80 is mounted on plate 76, and arm 82 fulcrumed at 78 carries on its free end a contact shoe 84, and is connected at 86 by link 48 to bellows head 20.

In operation, when liquid is put into the tank the float will rise, and will rotate plate 76 and resistance strip 80 around fulcrum 78 while arm 82 is held stationary by its connection through link 48 to bellows head 20. Relative movement of strip 80 and shoe 84 will give a remote indication, as in Fig. 1.

When the float has reached the limit of its upward travel, against stop 88, the liquid will have covered bellows head 20 and as the liquid level rises further the bellows will compress gradually, depressing arm 82 and causing shoe 84 to travel along strip 80, which is now stationary.

It is not necessary that the float be stopped at a point directly opposite the top of the bellows; actually the float can stop at any point above the bellows head, and in order that the indication will not be impaired at the point where the float stops and the static head takes over, the sensitivity of the bellows and the spring must be either made or adjusted so they will respond to the liquid head when the float stops.

It is to be understood that the invention is not limited to the specific embodiment herein illustrated and described, but may be used in other ways without departure from its spirit as defined by the following claims.

What is claimed is:

1. In a system for indicating the liquid contents of a tank, indicator control means, hydrostatically-operated means for varying said indicator control means through one range of liquid level, and float-operated means for varying said indicator-control means through another range of liquid level, and means for automatically transferring the control of said first mentioned means from one to the other of said second and third mentioned means when the liquid level is within the range of each said means respectively.

2. In a system for indicating the liquid contents of a tank, indicator control means including a movable element, hydrostatically-operated means for operating the said movable element of said indicator control means through one range of liquid level, and float-operated means for operating the same movable element of said indicator-control means through another range of liquid level, and means for automatically transferring the control of said first mentioned means from one to the other of said second and third mentioned means when the liquid level is within the range of each said means respectively.

3. In a system for indicating the liquid contents of a tank, indicator control means including two movable cooperating elements, hydrostatically-operated means for operating one of the movable elements of said indicator control means through one range of liquid level, and float-operated means for operating the other of said movable elements of said indicator-control means through another range of liquid level, and means for automatically transferring the control of said first mentioned means from one to the other of said second and third mentioned means when the liquid level is within the range of each said means respectively.

CLARENCE A. DE GIERS.